July 23, 1968 H. W. PAEHR 3,394,219

PICKUP APPARATUS FOR COLOR TELEVISION PICTURES

Original Filed Sept. 10, 1962

PRIOR ART

INVENTOR
HANS W. PAEHR

BY Larson and Taylor
ATTORNEYS 3,394,219
Patented July 23, 1968

3,394,219

PICKUP APPARATUS FOR COLOR TELEVISION PICTURES

Hans W. Paehr, Bad Homburg vor der Hohe, Germany, assignor to Hazeltine-Aga Laboratorium G.m.b.H., Frankfurt am Main, Germany, a corporation of Germany Continuation of application Ser. No. 222,710, Sept. 10, 1962. This application May 17, 1966, Ser. No. 562,411
Claims priority, application Germany, Sept. 28, 1961, H 43,739
7 Claims. (Cl. 178—5.4)

ABSTRACT OF THE DISCLOSURE

A pickup apparatus for color television wherein the light quantity acting upon a pickup device delivering a luminance Y-signal is increased over the light quantities acting upon the remainder of the system pickup-devices delivering the primary color signals (R, G, B or X, Z) so as to increase the value of signal-to-noise ratio in the Y pickup-device as compared with the signal-to-noise ratios of the other devices. This increase is of such a value as to make the difference in signal-to-noise ratios at least 8 db. The Y luminance signal is derived solely from the output voltage of the Y pickup-device.

The present application is a continuation of the pending application Ser. No. 222,710 filed Sept. 10, 1962, now abandoned by the same inventor.

The present invention relates to the generation of color television signals, more particularly, to the pickup apparatus for color television pictures to be transmitted by a combination of luminance and color signals.

It is known to generate color television signals by employing three groups of photocells, or a camera having three pickup tubes, to which the incident light is distributed in accordance with its color so that the output voltages can be derived representing different primary colors of the scene being televised. These output voltages are then converted into a luminance signal and two chrominance signals by matrixing circuits. Three main types of camera may be used with the system, namely, a camera in which the three pickup tubes produce respectively red, green and blue output voltages, a camera in which the output voltages produced by the three tubes are R, Y and B, and a camera in which the three tubes produce output voltages corresponding to the values X, Y and Z known from colorimetry.

Depending upon the quantity of the available light and on the light sensitivities of the photocells or pickup tubes the output voltages of these devices and, consequently, also the signals derived therefrom, are more or less affected by noise.

If these derived signals are then fed to a constant luminance color television receiver, i.e., a receiver producing a picture the luminance of which depends on the luminance signal only and not on the color signal, it will be observed that noise in the luminance signal annoys the human eye much more than noise in the color signal. That is to say that a higher noise level can be tolerated on the chrominance signals than on the luminance signals. In the prior art, it has been proposed to reduce the noise on the luminance signal relative to the noise on the chrominance signal by a factor of the order of 1:5 by correspondingly increasing the relative proportion of light acting upon the Y pickup tube of the television camera. However it was not recognized that merely increasing the relative proportion of light acting upon the Y pickup device is not sufficient in itself. In this prior art arrangement the derived luminance signal $E'_Y$ had a signal-to-noise value of 20 db. On a picture tube having a quadratic characteristic the noise portion of the picture current would be reduced to 5%, corresponding to a signal-to-noise value of 26 db. This meant that the noise from the red photocell appeared as luminance noise in a black-and-white receiver or in a constant luminance receiver without any reduction in strength.

Thus based upon the known prior art, the problem is presented that with the usual pickup apparatus nearly equal signal-to-noise ratios are produced in all signals, that is to say, that the luminance signal is too poor and/or the color signals are too good with respect to noise.

It is therefore the object of the present invention to provide a pickup apparatus for color television which reduces the visible noise in the reproduced picture.

It is another object of the present invention to provide a modification of known color television pickup apparatus wherein the luminance and color signals derived from the primary voltages are accompanied by noise signals of such intensities that the visible noises in the luminance and color signals become substantially equal.

In the present invention it has been discovered that the signal-to-noise ratio in the color television signal can be improved by employing a Y pickup device and increasing the relative proportion of light acting upon this Y pickup device. Further, this relative increase must be such so as to increase the value of the signal-to-noise ratio in the output voltage of the Y pickup device by at least 8 db. over the value of the signal-to-noise ratio in the output voltage of each of the other pickup devices. In addition in the present invention it is recognized that increasing the relative proportion of light acting upon the Y pickup device is in itself not enough. In order to obtain the full benefit of the increase in the relative proportion of light acting upon the Y pickup device, in the present invention the luminance signal $E_Y$ has been derived from the Y pickup device *alone*. At the same time the increase of the relative proportion of light acting upon the Y pickup device is maintained. As a result of the present arrangement the improved signal-to-noise ratio in the output voltage of the Y pickup device is fully preserved and becomes fully effective in the color television signal supplied to the receiver.

In one embodiment of the present invention there is provided picture signal generating apparatus for color television which comprises at least three groups of pickup devices which generate output voltages in response to incident light. Each of these groups has at least one pickup device. The pickup devices of one of said groups has a spectral response comparable to that of the human eye while the spectral response of the pickup devices of each of the other groups comprises one of the primary colors. The first group of pickup devices receives such a portion of the total light quantity incident upon all of the pickup devices that the output voltage of the first group of pickup devices has a signal-to-noise ratio which is at least 8 db greater than the signal-to-noise ratio in the output voltages of each of the other groups of pickup devices.

Other objects and advantages of the present invention will be apparent upon reference to the accompanying description when taken in conjunction with the following drawings wherein.

Proceeding next to the drawings wherein like reference symbols indicate the same parts throughout the various views a specific embodiment and modifications of the present invention will be described in detail.

Figure 1:
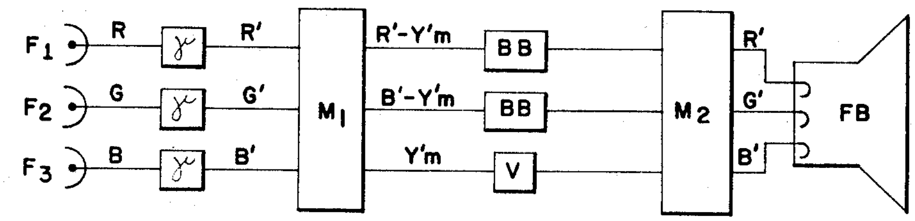
FIG. 1 is a schematic electrical circuit diagram representing a known pickup apparatus for color television.

Referring to FIG. 1, the prior art pickup apparatus represented therein consists essentially of a flying-spot scanner the raster of which is projected on the object by an optical system, and of photocells picking up the light reflected by the object and converting it into photo currents corresponding to the picture contents in the primaries.

This scanner works with the primaries red, green and blue to which the spectral sensitivities of the photocells $F_1$, $F_2$, and $F_3$ in FIG. 1 correspond. The primary voltages R, G and B delivered by the photocells are led to a gamma-corrector and then the gamma-corrected signals R', G' and B' are converted in a matrix $M_1$ into the luminance signal $Y'm$ and into the color difference signals $(R'-Y'm)$ and $(B'-Y'm)$.

The bandwidth of the color difference signals is reduced by the band limitators BB. Thereby the color difference signals are delayed and this delay is compensated by supplying the $Y'm$ signal to the delay circuit V. The signals thus produced are supplied to a receiver consisting mainly of a matrix $M_2$ which reconverts the signals into the primary voltages R', G' and B', of a picture tube FB which is driven by these voltages. The above-mentioned observation that luminance noise is more visible than color noice was made with such a scanner.

Figure 2:
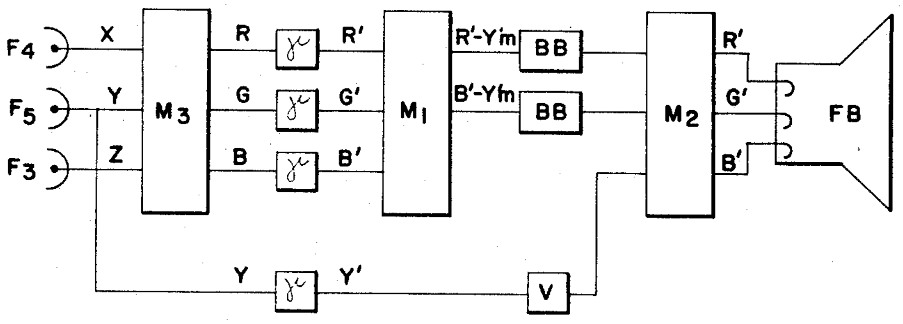
FIG. 2 is a schematic electrical circuit diagram of a color television pickup apparatus according to the teachings of the present invention.
Figure 3:
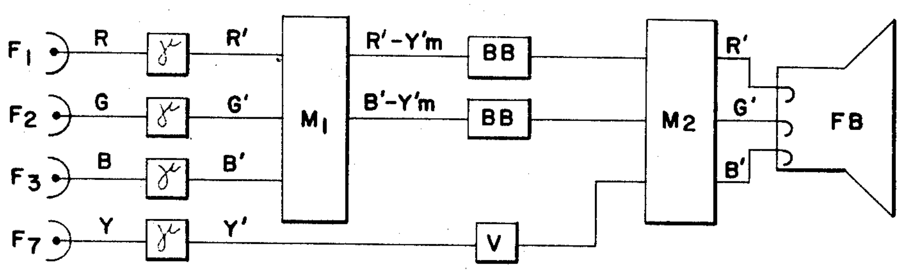
FIG. 3 is a schematic electrical circuit diagram of a modification of the pickup apparatus of the present invention.

In order to reduce the luminance noise with respect to the color noise, the prior art circuit diagram of FIG. 1 can be modified and these modifications are illustrated in FIGS. 2 and 3.

As described above the luminance noise with respect to the color noise is reduced by increasing the quantity of light incident upon the pickup device delivering the luminance signal Y over the quantities of light received by each of the pickup devices delivering the primary color signals. This will increase the value of the signal-to-noise ratio in the output voltage of the Y pickup device over the value of the signal-to-noise ratio in the output voltage of each of the other pickup devices. Further this difference between the light quantities is sufficiently great to obtain a difference of at least 8 db between the signal-to-noise ratios.

The present invention discloses three arrangements for increasing the quantity of light received by the pickup device delivering the luminance signal Y to obtain the predetermined difference between the signal-to-noise ratios of the output voltages. These arrangements can be summarized as follows:

(1) The light sensitive area of the Y pickup device is made greater than the light sensitive area of each of the other pickup devices.

(2) Each of the pickup devices comprises two or more photocells of equal area with the number of the photocells in the Y pickup device being larger than the number of photocells in the pickup devices for each primary color.

(3) Reducing the total available light while increasing the light sensitive area of the Y pickup device.

In FIG. 2, the spectral sensitivities of the photocells $F_4$, $F_5$, $F_6$ correspond to the primaries X, Y and Z known from the colorimetry. The matrix $M_3$ converts the output voltages X, Y and Z of these photocells into the reproduction primary voltages R, G and B which are treated in the same way as in the scanner shown in FIG. 1, with the exception, however, that the signal Y is not taken from the matrix $M_1$ but is taken directly from the photocell $F_5$ by a further gamma-corrector which delivers a gamma-corrected signal Y'. This is preferable because thus it is guaranteed that the step of reducing the luminance noise which will be explained hereinafter will not be made partly or entirely ineffective by two subsequent matrixing operations with interposed gamma correction.

The above-mentioned increasing of the light sensitive surface of the photocell $F_5$, which produces the luminance component of the color television signal, is essentially a non-uniform division or distribution of the total light quantity directly impinging upon all of the photocells $F_4$, $F_5$ and $F_6$ so that the larger photocell $F_5$ receives so much more of this incident light than each of the photocells $F_4$ and $F_6$ that the signal-to-noise ratio in its output voltage becomes 9 db higher than the signal-to-voltage ratio in the output voltages of the photocells $F_4$ and $F_6$.

There are numerous factors influencing the signal-to-noise ratio on the way from the pickup device to the picture tube, even if no supplementary noise be added. Such factors are, for example, the gamma correction of the primary voltages and the bandwidth limitation of the color signals. Therefore, the value by which the signal-to-noise ratio in the luminance signal must be higher than the signal-to-noise ratio in the color signals for obtaining a satisfactory reduction of the visible noise in the reproduced picture must be determined in each individual case. However, it has been discovered that with linear transmission and identical bandwidth of the signals the signal-to-noise ratio in the luminance signal must be at least 8 db higher than the signal-to-noise ratio in the color signals in order to obtain a satisfactory result.

There might be circumstances in which the noise in the luminance signal of a scanner as shown in FIG. 1 is already sufficiently low for practical use. In such cases the invention can be carried out either by reducing the size of the photocells, i.e. their light sensitive areas, producing the color signals or by reducing the intensity of the light source, i.e. of the flying-spot scanner and correspondingly enlarging the sensitive surface of the photocell $F_5$ in FIG. 2. Both these arrangements have the additional advantage of a lower cost.

The invention can also be carried out by replacing each of the photocells shown in the drawings by a group of two or more similar photocells of substantially equal light sensitive areas. In this case the enlargement or the reduction of the light sensitive surface, according to the invention, can be accomplished by increasing or decreasing the number of photocells constituting the individual groups.

Furthermore, it is obvious that the present invention is not limited to photocells used in combination with a flyng-spot scanner but covers also pickup apparatus consisting of color cameras having either separate pickup-tubes for each primary or a color pickup tube.

The above-mentioned additional economic advantage for the invention may at first glance seem dubious in view of the fact that the pickup apparatus as shown in FIGURE 2, as compared to the apparatus shown in FIGURE 1, comprises an additional matrix $M_3$ and an additional gamma corrector. However, the cost of this additional equipment is more than offset by the reduction of the costs due to the fact that with the apparatus according to the invention only the Y-channel need have full bandwidth while the bandwidth of the color signal channels can be limited to the color signal bandwidths.

FIG. 3 illustrates a further modification of the invention which may also have some importance independently of the reduction of visible noise in the reproduced picture. In this modification four primaries R, G, B and Y are used. The color difference signals $(R'-Y'm)$ and $(B'-Y'm)$ are produced by matrixing the primary voltages R, G and B and the reproducing primaries R', G', B' result from matrixing the color difference signals with the luminance signal Y produced by a separate photocell $F_7$. It has been found that with this arrangement the quality of the picture reproduction was, unexpectedly, independent of the spectral composition of the luminance signal.

Up to now it was believed necessary to assimilate the composition of the luminance signal as far as possible to the spectral sensitivity of the human eye for the color primaries. To this end, corresponding filters would have to be placed in front of the photocell $F_7$, although such filters are disadvantageous since they cause a loss of light and an increase in noise voltage.

In accordance with the above-mentioned observation there is no necessity for a filter to be placed in front of the photocell $F_7$ which produces the luminance signal. It is sufficient to use a photocell with a sensitivity maximum within the spectrum of the visible light. This means that there is no need for using photocells of different sizes in order to realize the present invention: the fact that the photocells $F_1$, $F_2$ and $F_3$ which produce the color signals may be provided with filter whereas the photocell $F_7$ does not have any filter is in itself sufficient for producing the non-uniform division of the available light among the photocells which is required, according to the invention, for reducing the visible noise in the reproduced picture.

These considerations apply as well to a television camera with four pickup tubes, e.g. iconoscopes, corresponding to the photocells $F_1$, $F_2$, $F_3$, $F_7$ in FIG. 3. In this case the arrangement according to the invention has still another advantage. Since here the picture signals supplied by the red-sensitive, green-sensitive and blue-sensitive pickup tubes are transmitted only with a reduced bandwidth, the problem of registration which otherwise makes these cameras rather delicate, is not critical. Thus, the invention makes it possible to construct rugged color television cameras which are easy to operate and thus are eminently suitable for industrial color television purposes.

The invention has been described above with reference to pickup apparatus in which the color difference signals $(R-Y)$ and $(B-Y)$ are used as color signals. However, all that has been stated with respect to such apparatus remains equally valid if the axis of the greatest and of the smallest sensitivity of the human eye to chromaticity differences are being used as color signal axis. These color signals are being used in the NTSC system where they are called I and Q axis and are transmitted with different bandwidths. In applying the present invention to such pickup apparatus it must be taken into consideration that color noise has a more disturbing effect in direction of the I axis than in direction of the Q axis so that a greater noise voltage may be tolerated in the Q signal than in the I signal.

While there have been described what are at present considered to be preferred embodiments of this invention, it will be obvious to those skilled in the art that various changes and modifications may be made therein without departing from the invention, as it is, therefore, aimed to cover all such changes and modifications as fall within the true spirit and scope of the invention.

What is claimed is:

1. Picture signal generating apparatus for color television comprising at least three groups of pickup devices to generate output voltages in response to incident light, each of said groups comprising at least one pickup device, the pickup devices of a first of said groups having a spectral response comparable to that of the human eye while the spectral response of the pickup devices of each of the other groups comprises one of primary colors, said first group of pickup devices being arranged to receive a portion of the total light quantity incident upon all of said pickup devices which is as much larger than the light quantity acting upon any of the other groups of pickup devices as to increase the value of the signal-to-noise ratio in the output voltage of said first group of pickup devices by at least 8 db over the value of the signal-to-noise ratio in the output voltages of each of the other groups of pickup devices, first means for deriving from the output voltage of said first group of pickup devices alone a luminance signal representative of a scene, and second means for deriving from the output voltages of three of the said groups of pickup devices chrominance signals representative of said scene.

2. Picture signal generating apparatus as claimed in claim 1 wherein the total light sensitive area of said first group of pickup devices is greater than the total light sensitive area of each of the other groups of pickup devices to produce said difference between the signal-to-noise ratios in said output voltages.

3. Picture signal generating apparatus as claimed in claim 1 wherein each group of pickup devices comprises only one pickup device and the pickup device of said first group has a larger light sensitive surface area than the pickup devices of the other groups.

4. Picture signal generating apparatus as claimed in claim 1 wherein all of said pickup devices have substantially equal light sensitive surface areas with the first group of pickup devices comprising at least two pickup devices and the number of pickup devices in each of the other groups of pickup devices being less than the number of pickup devices of said first group.

5. Picture signal generating apparatus as claimed in claim 1 comprising, in addition to said first group of pickup devices, a second group and a third group of pickup devices sensitive respectively to the primary X and to the primary Z known in colorimetry, and means for deriving at least two chrominance signals from the output voltages of all three said groups of pickup devices.

6. Picture signal generating apparatus as claimed in claim 1 and comprising, in addition to said first group of pickup devices, three further groups of pickup devices sensitive respectively to the red, green and blue primary colors, and means for deriving at least two chrominance signals from the output voltages of said three further groups of pickup devices.

7. Picture signal generating apparatus as claimed in claim 1 with there being four groups of pickup devices, each of these groups comprising at least one pickup device, the pickup devices of a first of said groups being sensitive to the visible light spectrum and the pickup devices of the second, third and fourth of said groups being sensitive respectively to the red, green and blue primary colors, and means for deriving at least two chrominance signals from the output voltages of said second, third and fourth groups of pickup devices.

References Cited

UNITED STATES PATENTS

| | | | |
|---|---|---|---|
| 2,900,441 | 8/1959 | Huntley | 178—5.4 |
| 3,196,205 | 7/1965 | Bedford | 178—5.4 |

OTHER REFERENCES

Zworykin et al.: Television, Wiley & Sons, New York, 1940, TK6630Z8 (pp. 218–219 relied on).

ROBERT L. GRIFFIN, *Primary Examiner.*

R. MURRAY, *Assistant Examiner.*